United States Patent

Gorndt

[15] 3,700,352
[45] Oct. 24, 1972

[54] ROTOR SYSTEM

[72] Inventor: John H. Gorndt, Erie, Pa.

[73] Assignee: Lord Corporation, Erie, Pa.

[22] Filed: March 5, 1971

[21] Appl. No.: 121,425

[52] U.S. Cl. .................................. 416/134, 416/141
[51] Int. Cl. ............................................. B64c 27/38
[58] Field of Search......416/106, 107, 134, 135, 138, 416/140, 141

[56] References Cited

UNITED STATES PATENTS

| | | | |
|---|---|---|---|
| 3,111,172 | 11/1963 | Gorndt et al. .............. | 416/134 |
| 3,292,712 | 12/1966 | Schmidt..................... | 416/134 |
| 3,501,250 | 3/1970 | Mosinskis.................. | 416/134 |
| 3,556,673 | 1/1971 | Killian ..................... | 416/141 X |

*Primary Examiner*—Everette A. Powell, Jr.
*Attorney*—James W. Wright

[57] ABSTRACT

A rotor system for a rotary wing aircraft such as a helicopter or the like wherein a main resilient bearing restrains movement of the blade against centrifugal forces imposed thereon while permitting movement of the blade about certain designated axes such as a lead-lag, a flapping and a pitch axis. A secondary resilient bearing cooperates with the main resilient bearing for restraining bodily movement of the blade transverse to its longitudinal axis and preventing the introduction of undesirable stresses into either of the resilient bearings without interfering with movement or substantially increasing the resistance to movement of the blade about the designated axes while insuring that such latter movements are generally about a point and/or axis generally coincident with the center of both resilient bearings.

11 Claims, 3 Drawing Figures

INVENTOR
JOHN H. GORNDT

BY James W. Wright

ATTORNEY

INVENTOR
JOHN H. GORNDT
BY James W. Wright
ATTORNEY

ROTOR SYSTEM

This invention relates to rotary wing aircraft such as helicopters or the like and more particularly to a rotor system and the means thereof for mounting the blade.

In conventional articulated rotor systems, it is customary to provide for each blade separate connections for each axis of movement desired. For instance, in a fully articulated system, three separate connections including precision roller bearings are provided for permitting pivotal movement of the blade about a lead-lag and a flapping axis and for rotation about a pitch axis.

In an effort to replace such complex structures and alleviate the many disadvantages associated therewith, attention has been directed to the use of resilient bearings such as that described in Gorndt et al., U. S. Pat. No. 3,106,965, issued Oct. 15, 1963 and assigned to the assignee of the present invention. As illustrated in the above referenced patent, these resilient bearings include a body of elastomer and a plurality of spaced plates of a particular construction and arrangement embedded in and bonded to the body of elastomer. The resilient bearing is assembled in the rotor system such that centrifugal forces imposed on the blade are resiliently restrained while designed for articulated movements of the blade relative to the rotor hub are permitted. For instance in a fully articulated rotor system where movements of each blade about a lead-lag, a flapping and a pitch axis are to be accommodated, the resilient bearing may comprise a body of elastomer disposed in load carrying relation between the blade and rotor hub such that centrifugal forces imposed on the blade load the body of elastomer in compression while movements of the blade about the lead-lag, flapping and pitch axes load the body of elastomer primarily in shear. In order to increase the compressive load carrying ability of the body of elastomer in a direction along the longitudinal axis of the blade without interfering with movement of the blade about the above mentioned axes, a plurality of spaced segmented spherical shaped plates of relatively nonextensible material are disposed transversely of the longitudinal axis of the blade and embedded in and bonded to the body.

However, in a resilient bearing such as that briefly described above, the same is subject to deformation or deflection in directions generally transverse to the longitudinal axis of the blade. As a result blade shear loads or forces on the blade transverse thereto cause undesirable bodily movements of the blade which result in imbalance of the rotor system to induce undesirable vibrations. In addition to the vibration problems discussed above, such blade shear loads induce additional and unnecessary stresses into the resilient bearing which substantially reduce the fatigue life thereof. Thus, it is highly desirable to introduce means into such a rotor system for carrying blade shear loads.

Suggested solutions to this problem, in fully articulated systems, are illustrated in Gorndt et al., U. S. Pat. No. 3,111,172, issued Nov. 19, 1963 and assigned to the assignee of the present invention and in Mosinskis, U. S. Pat. No. 3,501,250, issued Mar. 17, 1970. In the Mosinskis patent there is disclosed in cooperation with a main resilient bearing such as that briefly described above, a universal bearing including a socket fixed to the rotor hub and a ball rotatably mounted in the socket. The blade includes a supporting shaft rotatable with the ball and longitudinally movable relative to the ball. As will be apparent, this arrangement requires frictionally engaging surfaces between the ball and socket and between the ball and supporting shaft of the blade which frictionally engaging surfaces are undesirable for reasons that need not be discussed.

The last mentioned Gorndt et al. patent, U. S. Pat. No. 3,111,172, discloses a resilient universal bearing which cooperates with a main resilient bearing as described above for carrying blade shear loads. The utilization of such a resilient universal bearing does not include any frictionally engaging surfaces. While such a resilient universal bearing is believed to be advantageous over the arrangement illustrated in the Mosinskis patent, it too has its problems. First, the resilient universal bearing is constructed and arranged relative to the main resilient bearing to be neutral or undeflected when the rotor system is inoperative. As a result, during operation of the rotor system, the resilient universal bearing is deflected or stressed which stresses are detrimental to the fatigue life of such a bearing. Second, the center of the resilient universal bearing is generally coincident with the spherical center of the main bearing when the rotor system is inoperative. Thus, during operation of the rotor system, the respective centers of the resilient bearings are spaced from one another. Accordingly, lead-lag and flapping movements of the blade establish unnecessary stresses in both the resilient bearings which are detrimental to the fatigue life thereof. In addition, the resistance of the bearings to movements of the blade about lead-lag, flapping and pitch axes is unnecessarily high.

It is an object of the present invention to provide in a rotor system having a main resilient bearing for restraining the blade against centrifugal forces while permitting movement of the blade about certain designated axis, an improved resilient bearing for cooperating with the main resilient bearing to restrain bodily movement of the blade transverse to its longitudinal axis without interfering with movement of the blade about the designated axis.

Another object of the present invention is to provide in such a rotor system a resilient bearing which operates in a neutral or undeflected position during normal operation of the rotor system to restrain bodily movement of the blade transverse to its longitudinal axis.

A further object of the present invention is to provide in such a rotor system a resilient bearing which cooperates with the main resilient bearing to insure that movements of the blade about certain designated axis are generally about a point and/or axis generally coincident with the center of both resilient bearings to prevent the establishment of unnecessary stresses in each of the bearings.

Briefly, the objects of the present invention are accomplished in a rotor system including a rotor hub rotatable about a central axis, at least one sustaining blade, and means connecting the blade to the rotor hub with the blade normally extending generally radially from the hub for rotation therewith about the central axis. The connecting means comprises a member fixed to the blade having a surface extending transverse to the longitudinal axis of the blade and spaced from and presented toward the blade and away from the rotor hub and a member fixed to the rotor hub having a surface extending transverse to the longitudinal axis of the blade and spaced radially outward and presented toward the first surface. In a preferred arrangement the members are yokes carried by the rotor hub and blade, respectively, which are linked through each other and lie, respectively, in intersecting planes. A main resilient bearing is disposed between the surfaces and has its axis of greatest stiffness along the longitudinal axis of the blade and axes of less stiffness perpendicular or transverse to the longitudinal axis of the blade for resiliently restraining the blade against centrifugal forces imposed thereon in response to rotation of the rotor hub while permitting movement of the blade about the axes of less stiffness. In a fully articulated rotor system, the main resilient bearing typically takes the form of a body of elastomer disposed between and fixedly secured to the spaced surfaces and a plurality of spaced segmented spherical shaped plates of relatively nonextensible material disposed transversely of the longitudinal axis of the blade and embedded in and bonded to the body with their spherical centers coinciding with the longitudinal axis of the blade such that the body of elastomer and plurality of plates cooperate to restrain movement of the blade against centrifugal forces imposed thereon while permitting pivotal movement of the blade about lead-lag and flapping axis and rotation about a pitch axis.

A secondary resilient bearing is connected between the blade and rotor hub which has its axes of greatest stiffness perpendicular or transverse to the longitudinal axis of the blade and an axis of less stiffness coincident with the axis of greatest stiffness of the main resilient bearing means. The secondary resilient bearing is normally positioned in a predeflected position along the longitudinal axis of the blade during nonrotation of the rotor hub and is movable along the longitudinal axis of the blade to a neutral or undeflected position in response to movement of the blade as a result of centrifugal forces imposed thereon. With the secondary resilient bearing having its axes of greatest stiffness perpendicular or transverse to the longitudinal axis of the blade, it will be apparent that the same cooperates with the main resilient bearing to restrain movements of the blade transverse to the longitudinal axis of the blade. By having the secondary resilient bearing movable to a neutral position during normal operation of the rotor system, no unnecessary stresses remain in the secondary resilient bearing and, thus, the fatigue life of such bearing is optimized. Furthermore, by having the secondary resilient bearing predeflected and movable to a neutral position, provisions can be made to insure that the center of the secondary resilient bearing coincides with axes of designated movements of the blade and the center of the main resilient bearing such that during the movements of the blade about such designated axes only the necessary stresses are introduced into the resilient bearings to further optimize the fatigue life thereof and minimize the resistance to movement of the blade about these axes. The stiffness of the secondary resilient bearing along axes perpendicular or transverse to the longitudinal axis of the blade may be and is preferably increased by the provision of at least one annular plate of relatively nonextensible material disposed in the elastomer concentrically about the longitudinal axis of the blade.

Some of the objects of the invention having been stated, other objects will appear as the description proceeds, when taken in connection with the accompanying drawings, in which.

Figure 1:
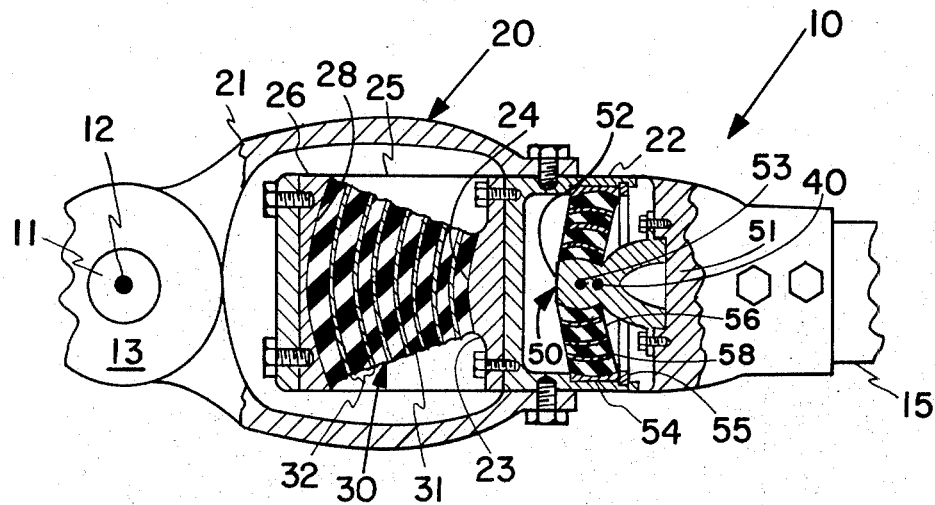
FIG. 1 is a fragmentary top plan view with portions in section illustrating a rotor system of the present invention.
Figure 2:
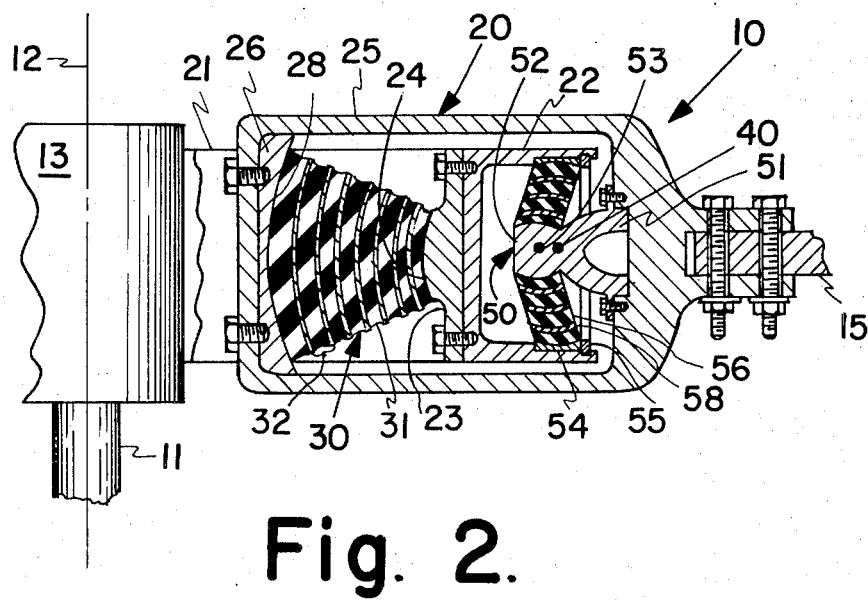
FIG. 2 is a fragmentary side elevational view with parts in section of the rotor system of FIG. 1.

Referring more specifically to the drawings wherein like reference characters are employed to indicate like parts, there is shown in FIGS. 1 and 2 a rotor system, generally indicated at 10, illustrating the preferred embodiment of the present invention. While the rotor system 10, to be hereinafter described, is for a fully articulated system, the concepts of the present invention apply to less than fully articulated systems and to systems having any number of blades. Since the connections typically are the same for each blade, only that associated with a single blade will be described.

As illustrated, the rotor system 10 comprises a drive shaft 11 which is rotatable driven by drive means, not shown, about its longitudinal or central axis 12. A rotor hub 13 is concentrically mounted on the drive shaft 11 for driving rotation thereby about the central axis 12. A sustaining blade 15 is connected to the rotor hub 13 by means, generally indicated at 20, with the blade 15 normally extending generally radially from the rotor hub 13 for rotation therewith.

As is well known in a fully articulated rotor system 10, the means 20 connecting the blade 15 to the rotor hub 13 must restrain movement of the blade 15 against centrifugal forces imposed thereon while providing for pivotal movement of the blade 15 relative to the rotor hub 13 about a lead-lag or sometimes referred to as drag axis, a flapping axis and for rotation about a pitch or feathering axis. The lead-lag axis is in a vertical plane through the rotor hub 13 and, thus, is for movement of the blade 15 relative to the rotor hub 13 in the plane of rotation of the blade 15. The flapping axis is in a horizontal plane through the rotor hub 13 and is for movement of the blade 15 relative to the rotor hub 13 in a plane perpendicular to the plane of rotation of the rotor hub 13. These lead-lag and flapping motions are typically associated with aerodynamic affects on the blade 15, the weight of the blade 15 and changes in speeds of rotation of the blade 15 about the central axis 12. The pitch axis is coincident with the longitudinal axis of the blade 15 and, thus, is for rotation of the blade 15 about its own longitudinal axis. Pitch motions are movements involved in maneuvering the aircraft and are required in all conventional vertical take-off and landing aircraft such as helicopters and the like. Pitch control means, not shown, are provided for imparting the desired pitch motion to the blade 15.

The means 20 connecting the blade 15 to the rotor hub 13 includes a yoke 21 disposed in the plane of rotation of the rotor hub 13 and carried by the rotor hub 13. The radially outward end of yoke 21 has a hub 22 having a closed end and an open end carried thereby disposed concentrically about the longitudinal axis of the blade 15 with the open end thereof extending radially from the rotor hub 13. On the closed end of the hub 22 there is mounted an outer plate member 23 that defines a surface 24 extending transverse to the longitudinal axis of the blade 15 and facing radially inward toward the rotor hub 13. The surface 24 preferably has a spherical curvature with the spherical center thereof coinciding with the longitudinal axis of the blade 15 radially outward of the surface 24 from the rotor hub 13.

A yoke 25 is disposed radially outward of yoke 21 and lies in a plane which intersects the plane of yoke 21. The yokes 21 and 25 are linked through each other. The blade 15 is suitably connected to the radially outermost portion of yoke 25 to extend radially from the rotor hub 13. The radially innermost end of yoke 25 has an inner plate member 26 mounted thereto which defines a surface 28 extending transverse to the longitudinal axis of the blade 15 and spaced radially inward of surface 24. The surface 28, preferably, has a spherical curvature with the spherical center thereof coinciding with the longitudinal axis of the blade 15 radially outward of the surface 28. Thus, surfaces 24 and 28 are disposed in opposed and presented toward each other relation.

A main resilient bearing, generally indicated at 30, connects yokes 21 and 25 and comprises a body 31 of elastomeric material such as natural or synthetic rubber which is disposed between and has opposite ends thereof fixedly secured such as by bonding to the surfaces 24 and 28. In the construction here illustrated, opposite ends of the body 31 of elastomer conform and are bonded to the surfaces 24 and 28 of plates 23 and 26, respectively. The plates 23 and 26 are preferably detachably carried by yokes 21 and 25, respectively. Thus, the body 31 of elastomer may be bonded to the plates 23 and 26 prior to their assembly with the main body of yokes 21 and 25.

With the body 31 of elastomer so disposed, centrifugal forces imposed on the blade in response to rotation thereof will be resiliently restrained by compression loading of the body 31 of elastomer. Since the centrifugal forces imposed on the blade are quite large, it is desirable to include a plurality of shims or plates 32 of metal or other suitable nonextensible material spaced throughout the body 31 of elastomer which extend transversely of the longitudinal axis of the blade and are embedded in and bonded to the body 31. In the arrangement here illustrated, the plurality of plates 32 are spaced segmented spherical shaped plates disposed transverse to the longitudinal axis of the blade 15 with their spherical centers coinciding with the longitudinal axis of the blade radially outward from the rotor hub 13 and outwardly of both surfaces 24 and 28. While the spaces between the plates 32 are indicated as being nonuniform, such nonuniformity does not form a part of the present invention. The plates 32 divide the body 31 of elastomer to prevent bulging thereof under compression loading to thereby increase its stiffness along an axis coincident with the longitudinal axis of the blade 15. On the other hand, the plates 32 do not materially affect the stiffness of the body 31 in shear and, accordingly, do not affect the resistance of the main resilient bearing 30 in accommodating lead-lag, flapping and pitch movements of the blade 15. Thus, the body 31 of elastomer and plurality of plates 32 cooperate to resiliently restrain the blade 15 against centrifugal forces imposed thereon in response to rotation of the rotor hub 13 without significant deflection thereof while permitting movement of the blade 15 about the lead-lag, flapping and pitch axes.

In the preferred arrangement of the present invention, it is desirable that the spherical centers of the surfaces 24 and 28 and of each of the spherical plates 32 coincide at a common point 40 during normal operation of the rotor system 10. While this may be difficult to obtain in practical application, for general purposes of the present invention it can be assumed that during non-operation and operation of the rotor system, the spherical centers of the surfaces 24 and 28 and segmented spherical plates 32 generally coincide about a common or fixed point 40 which is coincident with the longitudinal axis of the blade 15. By having such a coincident center during normal operation of the rotor system, the lead-lag, flapping and pitch axes will intersect at the coincident center 40 and all movements of the blade 15 will take place about this coincident center 40.

In a rotor system where the main resilient bearing 30 as described above is the only means connecting the blade 15 to the rotor hub 13, it will be apparent that blade shear loads or loads on the blade 15 transverse to its longitudinal axis will tend to deflect the main resilient bearing 30 and thus, allow bodily movement of the blade 15. Such bodily movements of the blade establish an imbalance in the entire rotor system 10 which imbalance induces undesirable vibrations into the rotor system. Furthermore, such bodily movements introduce unnecessary stresses into the body 31 of elastomer and, thus, contribute to a reduction in the fatigue life thereof. In addition, there is no positive assurance that lead-lag, flapping and pitch movements of the blade 15 take place about the common or fixed point 40.

In accordance with the present invention there is provided a secondary or universal resilient bearing, generally indicated at 50, which is connected between the blade 15 and rotor hub 13 and cooperates with the main resilient bearing 30 to restrain bodily movement of the blade 15 transverse to the longitudinal axis thereof, and to positively insure that lead-lag, flapping and pitch movements of the blade 15 take place about the common or fixed point 40 without interfering with lead-lag, flapping and pitch movements of the blade 15.

The resilient universal bearing 50 comprises an elongate member 51 disposed between the blade 15 and rotor hub 13 radially outward of the main resilient bearing 30 with its longitudinal axis being coincident with the longitudinal axis of the blade 15. The outermost end of elongate member 51 is detachably connected to yoke 25 which, as hereinbefore described, is in turn connected to the blade 15 and is movable therewith. The innermost end of the member 51 is spherical shaped in the form of a ball 52 with its spherical center 53 being coincident with the longitudinal axis of the blade 15. In the nonoperating condition of the rotor system 10 as illustrated in FIGS. 1 and 2, the spherical center 53 of ball 52 is disposed radially inward of common or fixed center 40 of the main resilient bearing 30 a distance preferably equivalent to the radial displacement of the blade 15 during normal operation of the rotor system 10. As illustrated the hub 22 of yoke 21, carried by the rotor hub 13, is concentrically disposed about the elongate member 51. An annular socket 54 is carried inwardly of hub 22 concentrically about the longitudinal axis of the blade 15 in diametrically opposed relation to the common or fixed center 40 of the main resilient bearing 30. Preferably, as illustrated, the socket 54 is detachably connected to the hub 22 by suitable means such as a retaining ring 55 and defines a longitudinally extending concave surface concentrically about the longitudinal axis of the blade 15.

An annular body 56 of elastomer is concentrically disposed about the longitudinal axis of the blade 15 between the ball 52 and socket 54 and bonded thereto respectively, for resiliently interconnecting the same. In construction and assembly of the resilient universal bearing 50, the body 56 of elastomer is connected between the ball 52 and socket 54 such that during normal operation of the rotor system 10, the body 56 of elastomer is in a neutral or undeflected condition, that is, when the spherical center 53 of the ball 52 is coincident with the common or fixed center 40 of the main resilient bearing 30. Thus, during nonoperation of the rotor system 10, FIGS. 1 and 2, the body 56 of elastomer is predeflected.

Figure 3:
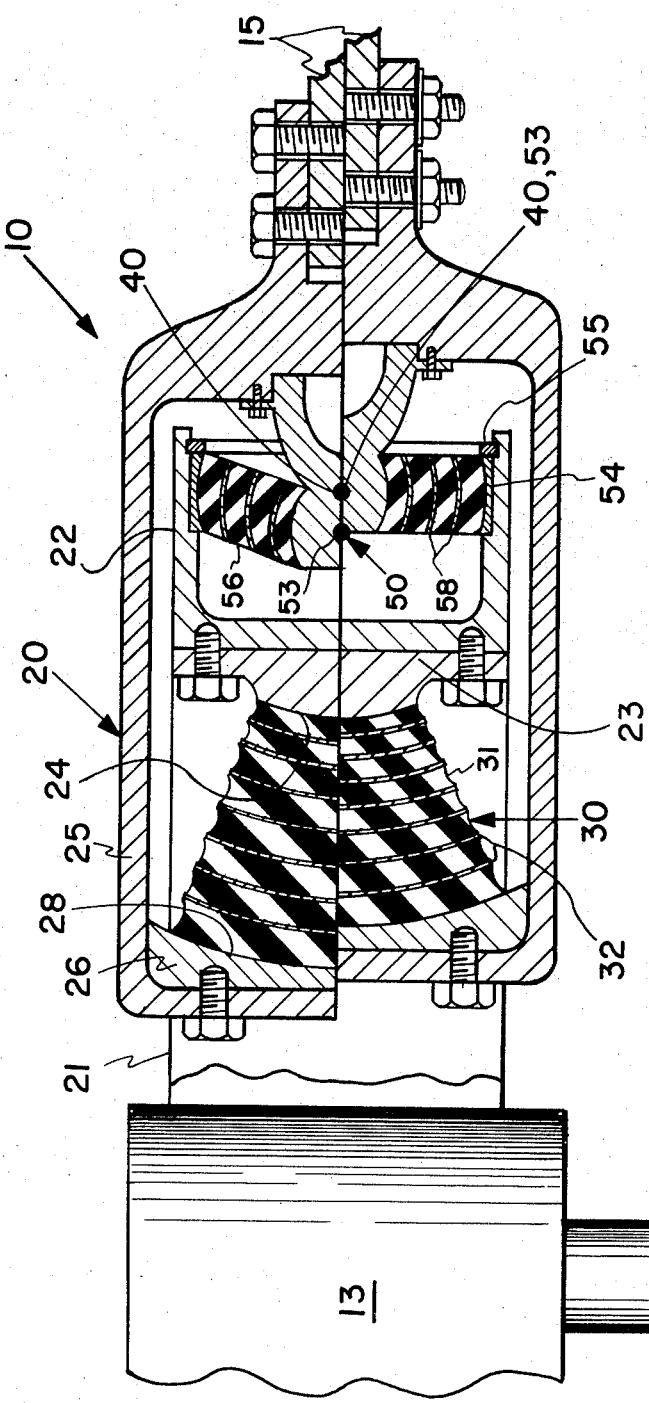
FIG. 3 is an enlarged view similar to FIG. 2 with the upper portion thereof illustrating the rotor system in a nonoperating position and the lower portion illustrating the rotor system in an operating position.

With reference to FIG. 3, there is shown in the upper half the relationship of the resilient bearings 30 and 50 during nonoperation of the rotor system 10 and in the lower half their relationship during normal operation of the rotor system 10. During normal operation centrifugal forces imposed on the blade 15 resiliently compress main resilient bearing 30 a limited amount and move the ball 52 such that its spherical center 53 coincides with the common or fixed center 40 of the main resilient bearing 30 and move the body 56 of elastomer to a neutral or undeflected position.

From the foregoing description, it will be apparent that blade shear loads or loads on the blade 15 transverse to the longitudinal axis thereof are resisted by compression loading of the resilient universal bearing 50. The load carrying ability or stiffness of the resilient universal bearing 50 may be and preferably is increased by the inclusion of at least one and preferably a plurality of spaced annular segmented spherical shaped plates 58 of metal or other relatively nonextensible material disposed between the ball 52 and socket 54 and embedded in and bonded to the annular body 56 of elastomer. As illustrated in the lower half of FIG. 3, the plates 58 are concentrically disposed relative to each other with their spherical centers coinciding with the spherical center of ball 52 and the common or fixed center 40 of the main resilient bearing during normal operation of the rotor system 10. While the resilient universal bearing 50 cooperates with the main resilient bearing 30 to carry blade shear loads or loads transverse to the longitudinal axis of the blade 15, numerous other advantages are provided. First, both the main and universal resilient bearings 30 and 50 are forced to operate about a coincident center. Such operation prevents the establishment of the imbalance problems previously discussed and insures that lead-lag, flapping and pitch movements of the blade 15 only introduce necessary forces into the bearings 30 and 50 to prolong the fatigue lives thereof. Second, the resilient universal bearing 50 operates from a neutral position to prolong the fatigue life thereof. Third, the cooperation of bearings 30 and 50 to operate about a coincident center minimizes the resistance to movements of the blade 15 about its lead-lag, flapping and pitch axes while providing the other enumerated advantages.

In the drawings and specification, there has been set forth a preferred embodiment of the invention and, although specific terms are employed, they are used in a generic and descriptive sense only and not for purposes of limitation.

What is claimed is:

1. A rotor system for a rotary wing aircraft such as a helicopter or the like comprising
   a rotor hub rotatable about a central axis,
   at least one sustaining blade, and
   means connecting said blade to said rotor hub with said blade normally extending generally radially from said hub for rotation therewith about said central axis, said connecting means comprising
   a member fixed to the blade having a first surface extending transverse to the longitudinal axis of said blade and spaced from and presented toward said blade and away from said rotor hub,
   a member fixed to the rotor hub having a second surface extending transverse to the longitudinal axis of said blade and spaced radially outward of and presented toward said first surface,
   main resilient bearing means disposed between said surfaces and having its axis of greatest stiffness along the longitudinal axis of said blade and axes of less stiffness transverse to the longitudinal axis of said blade, said main bearing means resiliently restraining said blade against centrifugal forces imposed thereon in response to rotation of said rotor hub,
   a resilient secondary bearing means connected between said blade and rotor hub and having its axes of greatest stiffness transverse to the longitudinal axis of said blade and an axis of less stiffness coincident with the axis of greatest stiffness of said main resilient bearing means and the longitudinal axis of said blade, said secondary bearing means being normally positioned in a predeflected position along the longitudinal axis of said blade during nonrotation of said rotor hub and being movable along the longitudinal axis of said blade to a substantially neutral position in response to resilient movement of said blade relative to said rotor hub as a result of centrifugal forces imposed thereon during rotation of said rotor hub, said secondary bearing means cooperating with said main bearing means to carry forces transverse to the longitudinal axis of said blade.

2. A rotor system as set forth in claim 1, wherein said main resilient bearing means comprises
   a body of elastomer disposed between and fixedly secured to said surfaces, and
   a plurality of spaced plates of relatively nonextensible material disposed transversely of the longitudinal axis of said blade and embedded in and bonded to said body of elastomer, said body of elastomer and plates cooperating during rotation of said rotor hub to resiliently restrain said blade against centrifugal forces imposed thereon along the longitudinal axis of said blade by loading said body substantially solely in compression.

3. A rotor system as set forth in claim 1, wherein said resilient secondary bearing means comprises an elongate member disposed between said blade and rotor hub having its longitudinal axis coincident with the longitudinal axis of said blade, one end of said member being fixedly connected to one of said blade and rotor hub and the other of said blade and rotor hub having means concentrically disposed about said elongate member in spaced relation thereto, an annular body of elastomer disposed about the longitudinal axis of said blade and being fixedly secured between the other end of said elongate member and said means concentrically of said elongate member, and at least one annular elongate plate of relatively nonextensible material concentrically disposed about said elongate member and embedded in and bonded to said body of elastomer for increasing the load carrying ability or stiffness of said body along axes transverse to the longitudinal axis of said blade.

4. A rotor system for a rotary wing aircraft such as a helicopter or the like comprising a rotor hub rotatable about a central axis,
at least one sustaining blade, and
means connecting said blade to said rotor hub with said blade normally extending generally radially from said hub for rotation therewith about said central axis, said connecting means comprising a member fixed to the blade having a first surface extending transverse to the longitudinal axis of said blade and spaced from and presented toward said blade and away from said rotor hub, a member fixed to the rotor hub having a second surface extending transverse to the longitudinal axis of said blade and spaced radially outward of and presented toward said first surface, a first body of elastomer disposed between and fixedly secured to said surfaces, a plurality of spaced segmented spherical shaped plates of relatively nonextensible material disposed transversely of the longitudinal axis of said blade and embedded in and bonded to said body with their spherical centers coinciding with the longitudinal axis of said blade, said first body of elastomer and plurality of plates cooperating to carry substantially solely in compression centrifugal forces imposed on said blade in response to rotation of said rotor hub while permitting pivotal movement of said blade about lead-lag and flapping axis and rotation about a pitch axis, said lead-lag and flapping axis intersecting at a generally common point along said pitch axis, a resilient universal bearing means connected between said blade and rotor hub and having its axes of greatest stiffness transverse to the longitudinal axis of said blade and axes of less stiffness about its center, said universal bearing means being normally positioned in a predeflected position along the longitudinal axis of said blade during non-rotation of said rotor hub and being movable along the longitudinal axis of said blade to a substantially neutral position in response to resilient movement of said blade relative to said rotor hub as a result of centrifugal forces imposed on said blade during rotation of said rotor hub wherein its center is substantially coincident with said common point, so that during normal rotation of said rotor hub, lead-lag, flapping and pitch adjustment and/or movements of said blade relative to said rotor hub will be about said common point and forces on said blade transverse to the longitudinal axis thereof will be resisted by said universal bearing along its axes of greatest stiffness.

5. A rotor system, as set forth in claim 4, wherein said resilient universal bearing means comprises an elongate member disposed between said blade and rotor hub and having its longitudinal axis coincident with the longitudinal axis of said blade, one end of said member being fixedly connected to one of said blade and rotor hub and the other end of said member being spherical shaped, the other of said blade and rotor hub having means concentrically disposed about said spherical shaped portion of said elongate member, an annular body of elastomer concentrically disposed about the longitudinal axis of said blade between said spherical shaped portion of said elongate member and said means concentrically disposed about said spherical shaped portion, at least one annular segmented spherical shaped plate of relatively nonextensible material concentrically disposed about said spherical shaped portion of said elongate member and embedded in and bonded to said annular body of elastomer for increasing the load carrying ability or stiffness of said body along axes transverse to the longitudinal axis of said blade without substantially affecting the resistance to movement of said blade relative to said rotor hub about said lead-lag, flapping and pitch axes.

6. A rotor system for a rotary wing aircraft such as a helicopter or the like comprising a rotor hub rotatable about a central axis,
at least one sustaining blade, and
means connecting said blade to said rotor hub with said blade normally extending generally radially from said hub for rotation therewith about said central axis, said connecting means comprising a member fixed to the blade having a first surface extending transverse to the longitudinal axis of said blade and spaced from and presented toward said blade and away from said rotor hub, a member fixed to the rotor hub having a second surface extending transverse to the longitudinal axis of said blade and spaced radially outward of and presented toward said first surface, resilient main bearing means disposed between said surfaces resiliently restraining said blade against centrifugal forces imposed thereon in response to rotation of said rotor hub while permitting pivotal movement of said blade about lead-lag and a flapping axis and rotation about a pitch axis with said lead-lag and flapping axes intersecting at a substantially common point along said pitch axis, a resilient universal bearing means connected between said blade and rotor hub having a center coincident with said pitch axis, said universal bearing means being normally positioned in a predeflected position along the longitudinal axis of said blade during nonrotation of said rotor hub and being movable along the longitudinal axis of said blade toward a neutral position in response to resilient movement of said blade relative to said rotor hub as a result of centrifugal forces imposed on said blade during rotation of said rotor hub to a point where its center is substantially coincident with the intersection of said leadlag and flapping axes with said pitch axis so that during normal rotation of said rotor hub lead-lag, flapping and pitch adjustments and/or movements of said blade relative to said rotor hub will be about a common point.

7. A rotor system, as set forth in claim 6, wherein said resilient universal bearing means comprises
a socket carried by one of said blade and rotor hub,
a ball spaced inwardly of said socket and carried by the other of said blade and rotor hub, and
elastomeric means resiliently interconnecting said ball and socket.

8. A rotor system for a rotary wing aircraft such as a helicopter or the like comprising
a rotor hub rotatable about a central axis,
at least one sustaining blade, and means connecting said blade to said rotor hub with said blade normally extending generally radially from said hub for rotation therewith about said central axis, said connecting means comprising
a member fixed to the blade having a first surface extending transverse to the longitudinal axis of said blade and spaced from and presented toward said blade and away from said rotor hub,
a member fixed to the rotor hub having a second surface extending transverse to the longitudinal axis of said blade and spaced radially outward of and presented toward said first surface,
a first body of elastomer disposed between and fixedly secured to said surfaces,
a plurality of spaced generally concentric segmented spherical shaped plates of relatively nonextensible material disposed transversely of the longitudinal axis of said blade and embedded in and bonded to said body of elastomer with their spherical centers coinciding at a generally fixed center coincident with the longitudinal axis of said blade,
said first body of elastomer and spherical plates cooperating to resiliently restrain said blade against centrifugal forces imposed thereon in response to rotation of said rotor hub along the longitudinal axis of said blade while permitting pivotal movement of said blade about lead-lag and flapping axes and rotation about a pitch axis, which axes intersect at said generally fixed center, a socket carried by one of said blade and rotor hub,
a ball spaced inwardly of said socket and carried by the other of said blade and rotor hub with its center located along said pitch axis and elastomeric means resiliently interconnecting said ball and socket,
said ball and socket being normally resiliently displaced relative to each other axially of the longitudinal axis of said blade during nonrotation of said rotor hub and being movable along the longitudinal axis of said blade to a substantially neutral position where the center of said ball is generally coincident with said fixed center in response to centrifugal forces imposed on said blade whereby said bearings cooperate to resist movement of said blade transverse to the longitudinal axis of said blade while permitting pivotal and rotational movement of said blade about said coincident centers.

9. A rotor system, as set forth in claim 8 wherein said elastomeric means comprises a second body of elastomer and at least one annular spherical shaped plate of relatively nonextensible material concentrically disposed between said ball and socket and embedded in and bonded to said second body of elastomer, said plate having its spherical center generally coincident with said coincident centers when said ball and socket are in said neutral position for increasing the load carrying ability or stiffness of said second body of elastomer along axes transverse to the longitudinal axis of said blade without substantially affecting the resistance to movement of said blade relative to said rotor hub about said lead-lag, flapping and pitch axes.

10. A rotor system for a rotary wing aircraft such as a helicopter or the like comprising
a rotor hub rotatable about a central axis,
first yoke means carried by said rotor hub and extending radially outward therefrom,
second yoke means disposed radially outward of said first yoke means,
a sustaining blade connected to said second yoke means and extending radially outward from said rotor hub, said yoke means being linked through each other and lying respectively in intersecting planes, said first yoke means having a first surface extending transverse to the longitudinal axis of said blade facing radially inward toward said rotor hub, said second yoke means having a surface extending transverse to the longitudinal axis of said blade spaced radially inward of said first surface and presented toward said first surface in opposed relation thereto,
a body of elastomer disposed between and fixedly secured to said first and second surfaces,
a plurality of spaced segmented spherical shaped plates of relatively nonextensible material concentrically disposed transversely of the longitudinal axis of said blade and embedded in and bonded to said body of elastomer with their spherical centers coinciding with the longitudinal axis of said blade radially from said rotor hub outwardly of said first and second surfaces, said body of elastomer and plurality of plates cooperating to resiliently restrain said blade against centrifugal forces imposed thereon in response to rotation of said rotor hub while permitting pivotal movement of said blade about lead-lag and flapping axes and rotation about a pitch axis, said axes intersecting at a generally fixed center along said pitch axis, and a resilient universal bearing connected between said first and second yoke means radially outward of said body of elastomer having a center located along said pitch axis resiliently restraining movement of said blade transverse to said pitch axis while permitting pivotal movement of said blade about said lead-lag and flapping axes and rotation about said pitch axis, the center of said universal bearing being positioned in predeflected position along said pitch axis from said fixed center during nonrotation of said rotor hub and being movable along said pitch axis to a substantially neutral position where its center is generally coincident with said fixed center in response to centrifugal forces imposed on said blade.

11. A rotor system as set forth in claim 10, wherein the center of said resilient universal bearing is positioned in a predeflected position spaced along said pitch axis from said fixed center radially inward toward said rotor hub.

* * * * *